S. R. RIDGWAY.
SPRING FORK FOR CYCLES AND MOTOR CYCLES.
APPLICATION FILED JAN. 5, 1912.

1,042,480.

Patented Oct. 29, 1912.

WITNESSES:
John C. Sanders
Harry E. Irwin

INVENTOR
Samuel Robinson Ridgway
BY McMillan Hicks
ATTY.

UNITED STATES PATENT OFFICE.

SAMUEL ROBINSON RIDGWAY, OF BIRMINGHAM, ENGLAND.

SPRING-FORK FOR CYCLES AND MOTOR-CYCLES.

1,042,480.  Specification of Letters Patent.  Patented Oct. 29, 1912.

Application filed January 5, 1912. Serial No. 669,591.

*To all whom it may concern:*

Be it known that I, SAMUEL ROBINSON RIDGWAY, subject of Great Britain, residing at Birmingham, England, have invented new and useful Improvements in Spring-Forks for Cycles and Motor-Cycles, of which the following is a specification.

Figure 1:
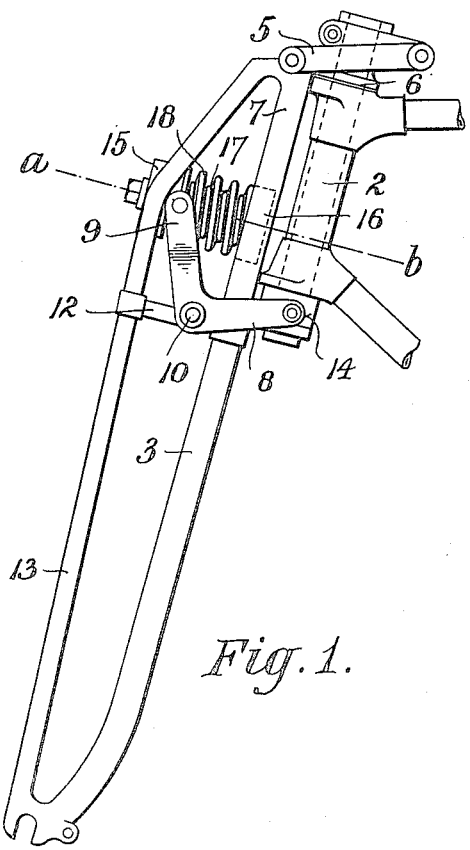
Figure 2:
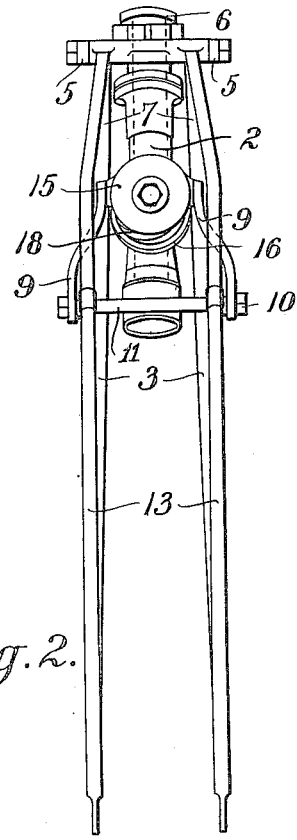
Figure 3:
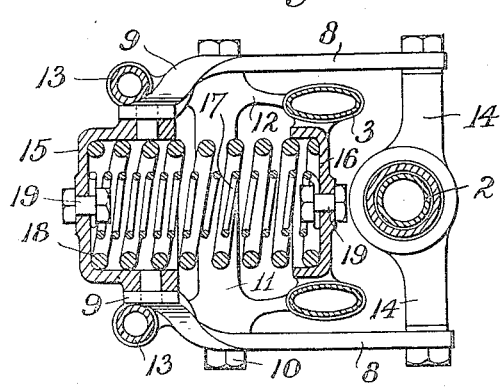

This invention has for its object certain new and useful improvements in spring forks for cycles and motorcycles, and it consists of the construction, combination, and arrangement of parts hereinafter described and claimed, and illustrated in the accompanying drawings wherein, Figure 1, is a side elevation of a spring fork constructed according to this invention. Fig. 2, is a front view of the same and, Fig. 3, represents a transverse section on the line *a—b* of Fig. 1.
Like parts are designated by similar reference characters in all of the figures of which Fig. 3 is drawn to a larger scale than the other figures.

Referring to the drawings, 2 represents the steering head or column which as usual passes up through and is rotatable on ball bearings within the inclined front member of the frame of the cycle or motorcycle, and 3 is the steering fork which is pivotally connected to the said head and its movement relatively thereto controlled by a spring or springs arranged in the manner hereinafter described in order to absorb the vibrations of the front steering wheel so that the frame and more particularly the handlebars of the machine may be insulated more or less completely from road shocks.

The pivotal attachment of the fork to the steering head is effected at its upper extremity by means of a pair of parallel links 5 arranged one at each side of the upper end 6 of the steering head and jointed at their forward ends either direct to upward extensions of the fork sides 7 or to forwardly arranged lugs thereon. These links move in a vertical plane and allow of relative movement between the fork and steering head.

The attachment of the fork to the lower part of the steering head is by means of a pair of parallel levers 8, 9 arranged one at each side of the said head. These levers are pivoted on a horizontal pin 10 said pin being rotatably mounted in a sleeve 11 supported by short transverse stays 12 brazed between the main stays 13 and the fork sides 3.

Each lever has one arm 8 pivoted to lugs 14 on the lower part of the steering head while the other or forward arm 9 is directed upwardly so that when the lever is turned about its horizontal pivot pin as a result of relative movement between the head and fork the free end of this arm moves in a direction approximately at right angles to the steering head. The said forward arms 9 of the levers are connected together by a rod or tube or as shown by a cupped or recessed plate or abutment 15 between which and a corresponding abutment 16 on the fork is arranged one or more spiral springs 17, 18 or buffers having its or their axis or axes at right angles or approximately at right angles to the steering head and lying in or parallel with the plane of the steering wheel. In the example shown, see especially Fig. 3, two springs are employed arranged co-axially the inner one 17 of which is attached at its ends to the abutments 15 and 16 respectively by bolts 19 and is adapted to take up the effect of the recoil of the outer main spring 18. The main spring 18 is confined in compression between the said abutments and together with the inner spring 17 is adapted to provide the desired anti-vibratory effect by absorbing and reducing the transmission of the road shocks to the handlebars and frame of the machine.

The fork may be arranged behind the steering head if desired but in either case the spring or springs or other resilient medium is or are arranged to be compressed in a horizontal direction or approximately at right angles to the steering head of the machine.

What I claim and desire to secure by Letters Patent of the United States is:—

1. A spring fork for motorcycles and the like, comprising a steering head, a pair of fork members, said members being pivotally connected to said steering head at both ends thereof, a resilient medium adapted to act along a line approximately at right angles to the steering head, and means for compressing said resilient medium upon relative movement between said fork members and said steering head.

2. A spring fork for motorcycles and the like comprising a steering head, a pair of fork members, means whereby the said fork members are pivotally connected with one end of said head, a pair of levers pivoted to said members and to the other end of said head, and a resilient medium located between the free ends of said levers and the fork and adapted to be compressed in a direction approximately at right angles to said head; substantially as set forth.

3. A spring fork for motorcycles and the like comprising a steering head, a pair of fork members, a pair of links pivoted to said members and to one end of said head, a pair of levers pivoted to said members one arm of each lever being jointed to the other end of said head while the other arm is arranged so that its free end moves in a direction approximately at right angles to the steering head, and a resilient medium located between said free ends of the levers and the fork, substantially as set forth.

4. A spring fork for motorcycles and the like comprising a steering head adapted to be rotatably mounted in the frame of the motorcycle, a pair of fork members rigidly secured together, a pair of links pivotally secured to the said members and to the upper end of said head, a pair of bell crank levers pivoted to said fork members and each having one arm pivotally secured to the lower end of said head and the other arms arranged so that their ends move in a direction at right angles to the steering head, an abutment carried by said fork members, and a spring buffer located between said ends and the abutment; substantially as set forth.

5. A spring fork for motorcycles and the like comprising a steering head, a pair of fork members of girder formation and rigidly joined together at their upper ends and at an intermediate point in their lengths, a pair of links pivotally secured to the upper end of said head and to the fork members, a pair of bell crank levers pivoted to said fork members and each having one arm pivotally secured to the lower end of said head and their other arms turned upwardly so that their ends move in a direction at right angles to the steering head, an abutment carried by said ends, a corresponding abutment carried by said fork, and a compound spiral spring buffer arranged between said abutments with its axis at right angles to the said steering head; substantially as set forth.

6. A spring fork for motorcycles and the like comprising a steering head, a pair of fork members, a pair of links pivoted to said members and to one end of said head, a pair of levers pivoted to said members one arm of each lever being jointed to the other end of said head while the other arm is arranged so that its free end moves in a direction approximately at right angles to the steering head, an abutment carried by said free ends of the levers, a corresponding abutment carried by said fork, a recoil spring attached at its ends to said abutments, and a main compression spring arranged co-axial with the re-coil spring and between said abutments; substantially as set forth.

In testimony whereof I have signed my name to this specification in the presence of two subscribing witnesses.

SAMUEL ROBINSON RIDGWAY.

Witnesses:
EDWIN CHASE,
CHRISTOPHER FRANK COATES.